INVENTOR.
COLUMBUS R. SACCHINI
ROBERT D. LOWERY
BY *William V. Ebs*
ATTORNEY

INVENTOR.
COLUMBUS R. SACCHINI
ROBERT D. LOWERY
BY William V. Ebs
ATTORNEY

United States Patent Office 3,451,512
Patented June 24, 1969

3,451,512
COIL SPRING CLUTCHES AND BRAKES
Columbus R. Sacchini and Robert D. Lowery, Willowick, Ohio, assignors, by mesne assignments, to The Marquette Metal Products Company, Cleveland, Ohio, a corporation of Ohio
Filed Jan. 2, 1968, Ser. No. 694,948
Int. Cl. F16d 67/02
U.S. Cl. 192—12                    12 Claims

ABSTRACT OF THE DISCLOSURE

In an intermittently operable unidirectional spring clutch, a main spring and a backstop spring each engage the output member of the clutch and each is also subject to engagement with a fixed member when the clutch is disengaged, the main spring being engageable at such time with the fixed member to prevent rotation of the output member in its driven direction and the backstop spring being engageable with the fixed member to prevent rotation in the opposite direction. A third spring 42 prevents the output member from overrunning the driving member.

Summary of the invention

Our invention relates to spring clutches particularly suited for intermittent operation, and subject to engagement and disengagement according to whether a control sleeve of the device is permitted to rotate or is restrained from rotation.

Spring clutches having a helical spring extending about input and output members, and having a control sleeve which engages one end of the spring and which may be restrained from rotating or permitted to rotate to thereby control operation of the device are well known. An important use for such clutches is in machinery where clutching and declutching operations must be performed repetitively over an extended period of time. Such clutches as presently known in the art are however subject to failure when required to function at a very rapid rate, as for example at a rate of the order of 40 cycles/sec., for a protracted period, and are apt to perform less than satisfactorily when required to precisely fix the position of the output member during each cycle of operation.

A prime object of this invention is to provide a clutch of the desired type which can be operated cyclically at a rapid rate over a long period of time and not fail.

Another object of the invention is to provide a clutch of the described type which is capable of precisely fixing the position of an output shaft during each operating cycle of engagement and disengagement.

It is still another object of the invention to provide a clutch of the described type in which an object shaft is restrained against reverse rotation when the clutch is disengaged.

Other objects and advantages of the invention will become apparent hereinafter.

Detailed description

Figure 1:
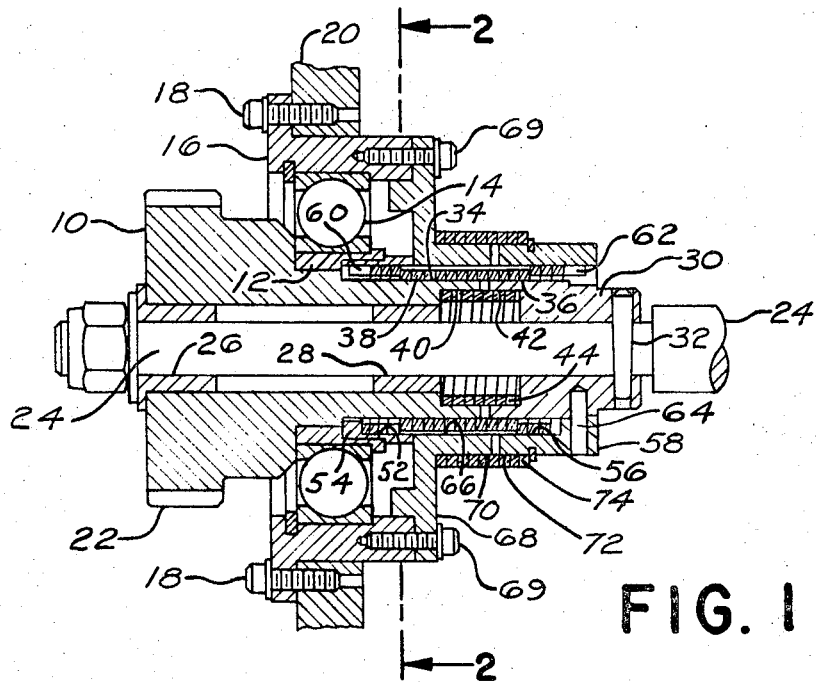
FIG. 1 is a longitudinal sectional view of a spring clutch constructed according to the invention.

Referring to the drawings, reference character 10 designates an input member of the clutch of the invention having a bushing 12 press fitted thereon. Such input member is rotatably supported through bushing 12 on a bearing 14 having its race supporting member 16 secured as by screws 18 to fixed structure 20. The input member 10 is provided with gear teeth 22 or is otherwise suitably adapted for engagement and continuous rotation by a driving member. An output shaft 24 is rotatably supported within the input member 10 on bushings 26 and 28. Such output shaft is affixed to an output member 30 of the clutch by pin 32. Input member 10 and output member 30 include outer cylindrical clutching surfaces 34 and 36 respectively which are engaged by helical coils of the main spring 38 of the clutch. The members 10 and 30 also include cylindrical surfaces 40 and 42 respectively which are engaged by an overrunning helical coil spring 44.

The main spring 38 is a step spring having an intermediate portion 46 which is less in diameter than opposite end portions 48 and 50. The diameter of the intermediate portion of the spring is such that in the clutch it has an interference fit with the input and output member clutching surfaces 34 and 36. End portion 48 of the spring has an interference fit with inner cylindrical surface 52 on a control sleeve 54 which is concentric with the clutching surfaces 34 and 36, whereas end portion 50 of the spring has an interference fit with an inner cylindrical surface 56 on a sleeve 58 which is also concentric with the surfaces 34 and 36. Preferably the spring end portions have tangs 60 and 62 affixed in sleeves 54 and 58 respectively to prevent any relative rotation of a spring end portion and the associated sleeve. It is also preferable that the interference fit between the spring end portions 48 and 50, and the surfaces 52 and 56 be tight to alleviate shear loads on the spring tangs 60 and 62. Sleeve 58 is affixed to the output member 30 by pin 64 as shown. The control sleeve 54 is however rotatably supported on bushing 12. The intermediate portion 46 of the main spring 38 is engageable on expansion with the inner cylindrical surface 56 of sleeve 58 and with an inner cylindrical surface 66 formed on a member 68 which is affixed by screws 69 to the stationary race supporting member 16. The inner cylindrical surface 66, like surface 56, is concentric with the surfaces 34 and 36.

Members 68 and 58 include cylindrical clutching surfaces 70 and 72 respectively which are engaged by a helical backstop spring 74. Spring 74 is a step spring that is assembled in the clutch so that its lesser diameter coils 76 tightly interfere with cylindrical surface 70 of member 68 and its greater diameter coils 78 interfere less tightly with cylindrical surface 72 on member 58. The overrunning spring 44 mentioned hereinbefore is also a step spring having greater diameter coils 80 in tight interference with cylindrical surface 40 on input member 10 and lesser diameter coils 82 in less tight interference with the cylindrical surface 42 on output member 30. All of the springs in the clutch, that is main spring 38, backstop spring 74 and overrunning spring 44, are all wound in the same direction.

Figure 2:
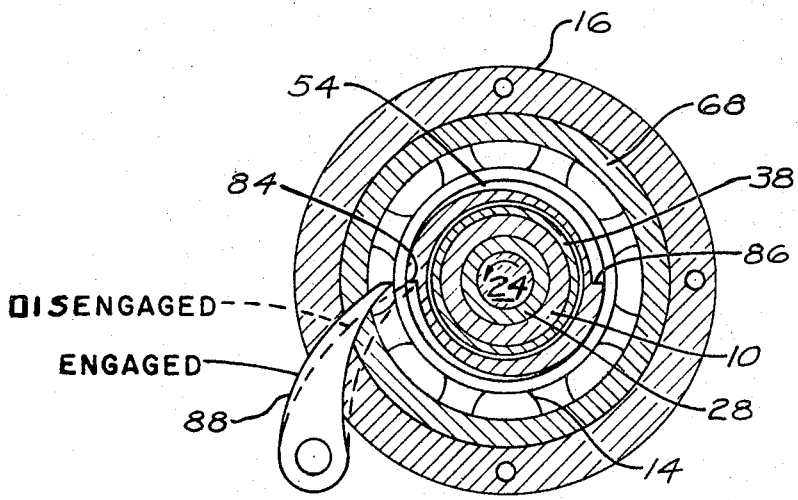
FIG. 2 is a sectional view taken on the plane of the line 2—2 of FIG. 1.
Figure 3:
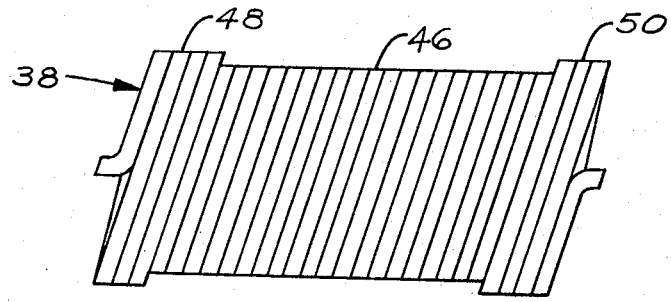
FIG. 3 is a plan view of the main spring used in the clutch of FIGS. 1 and 2.
Figures 4, 5:
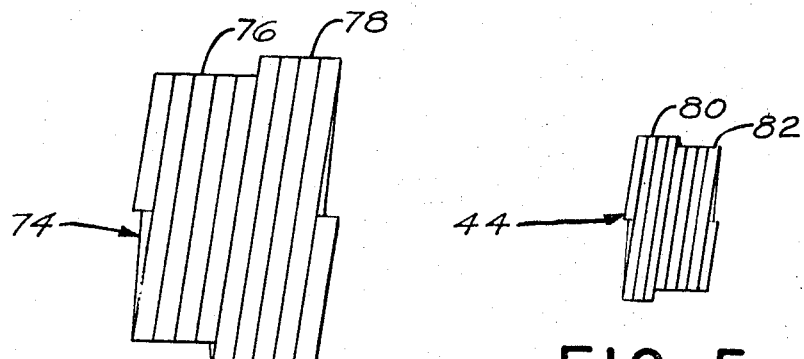
FIG. 4 is a plan view of a backstop spring used in the clutch of FIGS. 1 and 2.
FIG. 5 is a plan view of an overrunning spring used in the clutch of FIGS. 1 and 2.

In operation, the input member 10 of the clutch is driven unidirectionally in a direction such as to more tightly wind the main spring 38 against the clutching surfaces 34 and 36 (counter-clockwise as viewed in FIG. 2), and so cause the output member 30 as well as affixed output shaft 24 to be driven by input member 10 through the spring. While the output member 30 is being driven by input member 10, the spring 74 is held against rotation by the tight interference fit of its coils 76 with cylindrical surface 70 and its coils 78 are overrun by the output member. Spring 44 which is effectively affixed to the input member 10 by reason of the tight interference fit of its coils 80 with cylindrical surface 40 prevents the output member 30 from overrunning the input member since any such tendency causes coils 82 to tighten against cylindrical surface 42. During rotation of the output member 30 by the input member 10, control sleeve 54 rotates with the spring 38. The output member 30 and output shaft 24 may be stopped at predetermined positions by interrupting rotation of the sleeve 54 which as shown is provided with abutments 84 and 86 that may be engaged by suitable stop means such as pawl 88. When the rotation of sleeve 54 is interrupted, the intermediate portion 46 of spring 38 immediately expands against cylindrical surface 66 of fixed member 68 and cylindrical surface 56 of sleeve 58 to ground the output member 30 to the fixed member 68 through the spring 38 whereupon the output member 30 and output shaft 24 stop rotating. Reverse rotation of the output member 30 and output shaft 24 after the output member has been stopped is prevented by the backstop spring 74 since its coils 78 tighten against cylindrical surface 72 to resist rotation in a direction opposite to the drive direction. Disengagement of the pawl 88 from the control sleeve 54 causes the intermediate coils 46 of spring 38 to resume engagement with the clutching surfaces 34 and 36. Such coils are wound tight against the clutching surfaces by rotation of the input member, and the output member is once against driven by the input member through the spring 38.

Springs 38 and 44 function to prevent substantially any relative rotation of the input and output members of the clutch when pawl 88 is disengaged from the control sleeve 54, and the springs 38 and 74 function to assure that the output member 30 remains stationary when pawl 88 is in engagement with one of the abutments 84 or 86 on the control sleeve 54. The position of the output shaft may therefore be precisely controlled with the pawl 88. It is often convenient where the output shaft 24 is to be momentarily positioned periodically between intervals of rotation to have pawl 88 operably connected to whatever power source is used to drive input member 10 such that the pawl is moved into and out of engagement with abutments 84 and 86 as desired. Alternatively the pawl might be independently controlled as for example by a solenoid in response to electrical control signals. The impact upon pawl 88 when the pawl is caused to engage an abutment on sleeve 54 is slight since the mass of the sleeve is small and only a small force on the abutment is required to cause the spring 38 to expand into enforced engagement with cylindrical surface 66 on member 68 and cylindrical surface 56 on sleeve 58. The clutch can therefore be operated repetitively at a rapid rate and over a long period of time without damage to the pawl or control sleeve.

While only one embodiment of the invention has been shown and described, it will be apparent to those skilled in the art that various other embodiments are also possible, and that various changes and modifications may be made in the clutch disclosed. In particular it may be noted that either the backstop spring 74 or overrunning spring 44, or both such springs may be eliminated and roller clutches of a well-known type used instead to perform the functions of these springs. Other changes and modifications may also be readily made without departing from the spirit and scope of the invention as defined in the annexed claims.

What is claimed is:

1. A spring clutch comprising a rotatable input member and an axially aligned rotatable output member each with a cylindrical clutching surface;

A main spring in engagement with said cylindrical clutching surfaces, the spring being wound in a direction to connect the input and output members and drive the output member in a predetermined direction of rotation of the input member;

A fixed member having a cylindrical clutching surface;

A control sleeve in engagement with one end of the main spring and rotatable thereby;

Means for interrupting rotation of the control sleeve to disconnect the output and input members and to cause the spring to react against the cylindrical surface of the fixed member to stop rotation of the output member; and A backstop spring, said fixed member and output member each including a cylindrical clutching surface engaged by the backstop spring, the backstop spring being wound to prevent rotation of the output member in a direction opposite to the direction in which the output member is rotated by the input member.

2. A spring clutch as defined in claim 1 wherein the backstop spring has a tighter interference fit with the fixed member than with the output member.

3. A spring clutch as defined in claim 1 wherein the backstop spring is a step spring having one portion of a predetermined diameter in engagement with the fixed member and another portion of lesser diameter in engagement with the output member.

4. A spring clutch as defined in claim 1 including means rotatably supporting the sleeve on the fixed member.

5. A spring clutch as defined in claim 4 wherein the sleeve supporting means also rotatably supports the input member on the fixed member.

6. A spring clutch as defined in claim 1 including an additional cylindrical clutching surface on the input member, an additional cylindrical surface on the output member, and a spring in engagement with the said additional cylindrical clutching surfaces wound in a direction to prevent the output member from overrunning the input member.

7. A spring clutch as defined in claim 1 wherein an intermediate portion of the main spring is preloaded against the first mentioned cylindrical surfaces, the output member includes an additional cylindrical clutching surface, and the intermediate portion of the spring is caused to engage such additional clutching surface and the cylindrical surface of the fixed member upon interruption of the rotation of the sleeve.

8. A spring clutch as defined in claim 1 wherein the main spring is a step spring, the first mentioned cylindrical clutching surfaces are engaged by an intermediate portion of the main spring, such portion is preloaded against the first mentioned cylindrical surfaces, the output member includes an additional cylindrical clutching surface, and the main spring has opposite end portions preloaded against such additional cylindrical clutching surface and the sleeve respectively.

9. A spring clutch as defined in claim 7 wherein the cylindrical surface of the fixed member and said additional cylindrical surface of the output member are both engaged by the intermediate portion of the spring upon interruption of the rotation of the sleeve.

10. A spring clutch as defined in claim 8 wherein the cylindrical clutching surface of the fixed member and said additional cylindrical clutching surface of the output member have substantially the same diameter, said first mentioned cylindrical clutching surfaces have substantially the same diameter, and the diameter of the cylindrical clutching surface of the fixed member and additional cylindrical clutching surface of the output member is greater than the diameter of the said first mentioned cylindrical clutching surfaces.

11. A spring clutch comprising a rotatable input member and an axially aligned rotatable output member each with a cylindrical clutching surface;

A main spring in engagement with said cylindrical clutching surfaces, the spring being wound in a direction to connect the input and output members and drive the output member in a predetermined direction of rotation of the input member;

A fixed member having a cylindrical clutching surface;

A control sleeve in engagement with one end of the main spring and rotatable thereby;

Means for interrupting rotation of the control sleeve to disconnect the output and input members and to cause the spring to react against the cylindrical surface of the fixed member to stop rotation of the output member; and Means operably connected with the fixed and output members permitting rotation of the output member in the direction in which the output member is rotated by the input member but preventing rotation of such output member in the opposite direction.

12. A spring clutch as defined in claim 11 including means operably connected with the input member and output member to prevent the output member from overrunning the input member.

References Cited

UNITED STATES PATENTS

| | | |
|---|---|---|
| 2,575,012 | 11/1951 | Harvey. |
| 2,652,134 | 9/1953 | Montooth _____ 192—17.3 XR |
| 3,228,497 | 1/1966 | Schneider. |
| 3,337,015 | 8/1967 | Wagner. |
| 3,376,963 | 4/1968 | Schaffer. |

BENJAMIN W. WYCHE III, *Primary Examiner.*

U.S. Cl. X.R.

188—82.5; 192—16, 26, 41, 81, 48.92